(12) United States Patent
Sherman et al.

(10) Patent No.: US 7,456,138 B2
(45) Date of Patent: Nov. 25, 2008

(54) FUNCTIONAL FLUIDS CONTAINING ALKYLENE OXIDE COPOLYMERS HAVING LOW PULMONARY TOXICITY

(75) Inventors: John V. Sherman, Canton, MI (US); Ludwig Voelkel, Limburgerhof (DE); Marc Walter, Frankenthal (DE); Christian Wulff, Mannheim (DE); Michael Stoesser, Neuhofen (DE); Siegbert Brand, Speyer (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 443 days.

(21) Appl. No.: 10/845,353

(22) Filed: May 14, 2004

(65) Prior Publication Data
US 2005/0256014 A1 Nov. 17, 2005

(51) Int. Cl.
*C10M 107/34* (2006.01)
*C10M 173/02* (2006.01)
(52) U.S. Cl. ........................ 508/579; 508/513
(58) Field of Classification Search ............... 508/579, 508/513
See application file for complete search history.

(56) References Cited

U.S. PATENT DOCUMENTS

| 3,980,571 | A | * | 9/1976 | Marx ........................ 508/268 |
|---|---|---|---|---|
| 4,146,488 | A | * | 3/1979 | Martin ....................... 508/472 |
| 4,438,001 | A | * | 3/1984 | Suzuki et al. ............... 252/8.84 |
| 5,415,896 | A | * | 5/1995 | Mulvihill et al. ........... 427/388.4 |
| 6,355,845 | B1 | * | 3/2002 | Clement et al. ............. 568/616 |
| 6,429,166 | B1 | * | 8/2002 | Wehmeyer .................. 502/175 |
| 6,436,883 | B1 | * | 8/2002 | Nieh ........................... 508/579 |
| 2001/0031855 | A1 | | 10/2001 | Pollmann et al. |
| 2003/0153470 | A1 | * | 8/2003 | Lawford et al. ............. 508/199 |

OTHER PUBLICATIONS

"Pulmonary Toxicity of Polyalkylene Glycols," Supplied by the British Library—"the world's knowledge" www.bl.uk, ECETOC Technical Report No. 55, 55 pages.

* cited by examiner

*Primary Examiner*—Glenn Caldarola
*Assistant Examiner*—Jim Goloboy
(74) *Attorney, Agent, or Firm*—Oblon, Spivak, McClelland, Maier & Neustadt, P.C.

(57) ABSTRACT

The invention relates to a method of reducing the inhalation toxicity of functional fluids by incorporating into a functional fluid an effective amount of copolymer which is obtainable by copolymerizing etheylene oxide, propylene oxide and/or butylenes oxide with an initiator monool or diol, said copolymer having a degree of unsaturation of less than about 0.01 meq/g.

32 Claims, No Drawings

FUNCTIONAL FLUIDS CONTAINING ALKYLENE OXIDE COPOLYMERS HAVING LOW PULMONARY TOXICITY

The present invention relates to functional fluid formulations having low pulmonary toxicity containing alkylene oxide copolymers having a low degree of unsaturation, the use of the alkylene oxide copolymers and a method at reducing the inhalation toxicity of functional fluids.

Copolymers with ethylene oxide and propylene oxide as starting monomers have been used for many years as base oils for the preparation of high performance lubricants.

The method used for synthesis of these products is usually the anionic polymerization of ethylene oxide together with propylene oxide, starting from a mono- or difunctional alcoholate.

Functional fluids may be defined as fluids that provide multiple functions to meet the requirements of the given application. While an application may require emphasis on meeting one function such as lubrication or heat transfer, functional fluids are expected to perform other application requirements as well including; power transmission, corrosion inhibition, electrical insulation, low pour point, high viscosity index, minimal carbonaceous residue on decomposition, non-staining, low color formation, oxidative and thermal stability, hydrolytic stability, low aquatic toxicity and biodegradability.

Polyalkylene glycols also known as polyglycols possess unique properties due to their high oxygen content. They are excellent lubricants that are adsorbed onto metal surfaces. By varying the type and of monomer or ratio of monomers their structure can be water soluble or water insoluble. They are the only lubricant that can be water soluble.

Polyglycols were developed at the end of World War II and quickly found use in water based hydraulic fluids that would not ignite into a fire even when the hydraulic lines were pierced by bullets or shrapnel.

Many other applications were quickly identified including brake fluid engine lubricants, rubber and demoulding lubricants. Random copolymers of ethylene oxide and propylene oxide were found to be especially good lubricant basestocks most preferably the monoalkyl ether polymers.

The major advantages of these polyglycol copolymers as lubricants are their high viscosity index (i.e. low temperature dependence of the viscosity), low viscosity at low temperatures, low coefficients of friction even without the addition of friction/antiwear additives, controlled establishment of the degree of water solubility of the copolymer through the choice of the ethylene oxide/propylene oxide ratio (characterized by high turbidity points), non-corrosive and antistatic properties and very low pour points. Furthermore the thermal degradation of these polyglycol copolymers gives no residue. Linear copolymers having a weight ratio of ethylene oxide to propylene oxide monomers in the range from 40:60 to 60:40 have proven particularly advantageous. These copolymers have, on the one hand, very low pour points of less than −30° C., good water solubility (turbidity points greater than 50° C.) and very high viscosity indexes (greater than 250).

It is known form literature (ECETOC, European Centre for Ecotoxicology and Toxicology of Chemicals, Technical Report No. 55, Pulmonary Toxicity of Polyalkylene Glycols, Brussels, December 1997, ISSN-0773-8072-55) that some polyalkylene glycols show high acute pulmonary toxicity. Among these products are especially butanol initiated polyalkylene glycols which contain ethylene oxide and propylene oxide in a weight ratio of about 50:50. The toxicity increases with increasing weight. Thus, for example, monobutoxyethylene oxide/propylene oxide copolymers which contain ethylene oxide and propylene oxide in a weight ratio of 50:50 exhibited, at a molecular weight of about 4000 g/mol, high aerosol toxicity characterized by a low $LC_{50}$ value of only 106 mg/m$^3$. Also a dial initiated 50:50 EO/PO-random polyether having a molecular weight of 4000 g/mol showed a rather low $LC_{50}$ value of 350 mg/m$^3$. This high toxicity of the aerosol made it necessary for processors and users of these linear copolymers to take complicated technical measures, such as, for example, encapsulation of the plants, for protecting the personnel from aerosols.

A complicated way to replace these products is to change to a completely different chemistry. US 2001/0031855 teaches that polyol-initiated ethylene oxide/propylene oxide copolymers having a central branch and an ethylene oxide/propylene oxide weight ratio of from 40:60 to 60:40, starting from an alcohol having at least 4 OH groups, have outstanding properties with regard to pour point, water solubility and viscosity index and at the same time are not toxic on exposure to aerosols. For processors this avoids complicated technical measures for encapsulation of the plants and for protecting the personnel from aerosols. However the disadvantage of the products described in US2001/0031855 is that they require new formulations and that they do not always show satisfactory results in applications where usually butanol initiated products are used.

It was accordingly the object of the present invention to provide alkylene oxide copolymers suitable as base oils for lubricants which are started with monool or diol initiators and have nevertheless no toxicological potential on aerosol formation.

We have found that this object is achieved by an alkylene oxide copolymer which is obtainable by copolymerizing ethylene oxide, propylene oxide and/or butylene oxide with an initiator monool or diol, said copolymer having a degree of unsaturation of less than about 0.01 meq/g. The copolymers in general show a $LC_{50}$ value of more than 1000 mg/m$^3$ (4 hours), determined according to OECD Guideline method 403. The copolymers are preferably obtained in the presence of a DMC catalyst.

In one aspect, the invention therefore relates to a method of reducing the inhalation toxicity of functional fluids by incorporating into a functional fluid an effective amount of a copolymer which is obtainable by copolymerizing ethylene oxide, propylene oxide and/or butylene oxide with an initiator monool or diol, said copolymer having a degree of unsaturation of less than about 0.01 meq/g.

The degree of unsaturation of the copolymers of the invention is preferably less than 0.008 meq/g, more preferably less than 0.005 meq/g. The degree of unsaturation is determined measuring the iodine value (according to Kaufmann, DGF-C-V 116). The method gives the iodine value in g $I_2$/100 g polyether. A value of 1 g $I_2$/100 g corresponds to 0.0394 mmol $I_2$/g=0.0394 meq/g.

Preferred functional fluids are industrial lubricants, automotive lubricants, marine lubricants and aviation lubricants.

It has been surprisingly found that the copolymers of the invention having a degree of unsaturation of less than about 0.01 meq/g show a particularly low pulmonary toxicity. The $LC_{50}$ value of the copolymers of the invention is preferably more than 1500 mg/m$^3$, more preferably more than 2000 mg/m$^3$. The $LC_{50}$ value of the copolymers of the invention can be as high as 5000 mg/m$^3$ or even higher.

The $LC_{50}$ value is determined by one of the following identical test methods, OECD Guideline method 403; U.S. EPA Guideline OPPTS 870.1300; EU Guideline 92/69/EEC and 93/21/EEC: "Acute Inhalation Toxicity Study in Wistar Rats" (with 4-hour liquid aerosol exposure).

The alkylene oxide copolymers of the invention are generally incorporated into the functional fluid in an amount of from 75 to 99 wt.-%, based on the total weight of the anhydrous functional fluid.

The alkylene oxide copolymers of the invention are started with a monool or diol as initiator. The monool initiator is preferably a $C_1$-$C_{16}$ mono-alcohol or a polyoxyalkylene monoether of a $C_1$-$C_{18}$ mono-alcohol containing from 1 to 20 oxyalkylene units. Preferred oxyalkylene units are oxyethylene and/or oxypropylene units. The polyoxyalkylene monoether used as an initiator monool can be obtained by alkoxylating the $C_1$-$C_{18}$ mono-alcohol in the presence of an alkaline catalyst, such as sodium or potassium hydroxide, acidic catalyst, such as mineral acid, Lewis acid-catalyst, such as boron trifluoride or DMC-catalyst, such as described in below, in a separate step prior to the copolymerization step.

Diols can also be used as initiators. Preferred examples are ethyleneglycol, 1,2-propyleneglycol, 1,2-hexanediol, diethyleneglycol, triethyleneglycol, dipropyleneglycol and tripropyleneglycol.

More preferably, the monool initiator is selected from the group consisting of n-butanol, iso-butanol, 2-ethyl hexanol, 2-propyl heptanol, butyl glycol, butyl diethyleneglycol, butyl triethyleneglycol, butyl propyleneglycol, butyl dipropyleneglycol, butyl tripropyleneglycol, methyl diglycol, methyl triglycol, methyldipropyleneglycol, methyldipropyleneglycol, methanol, ethanol, hexanol, iso-nonanol, decanol, 2-butyloctanol, oleyl alcohol, octadecanol (e.g. stearyl alcohol), isononadecanol and commonly used mixtures of C4-C8-alcohols (degree of branching DOB<0,1), C6-C10-alcohols (DOB<0,1), C10-C18-alcohols (DOB<0,1), C12-C16-alcohols (DOB<0,1), C12-C14-alcohols (DOB<0,1), C16-C18-alcohols (DOB<0,1), C9-C11-alcohols (DOB<0,2), C12-C15-alcohols (DOB<0,2), C12-C13-alcohols (DOB 0,3-0,5)-C11-C15-alcohols (DOB 0,3-0,5), C13-C15-alcohols (DOB 0,4-0,6), isotridecanols (DOB 1,3-1,7), C16+alcohols (DOB 1,5-2,0), isodecanols (DOB 2,0-2,5), isotridecanols (DOB 2,0-2,5) and isotridecanols (DOB 3,2-3,8). The degree of branching (DOB) is defined as the number of methylgroups per molecule minus 1. A strictly linear alcohol like ethanol has one methyl group per molecule and consequently a degree of branching of 0. The degree of branching can be determined by NMR-analysis.

A particularly preferred initiator is n-butanol.

The alkylene oxide copolymers of the invention can be block copolymers or random copolymers. Preferred are ethylene oxide/propylene oxide copolymers, particularly preferred are ethylene oxide/propylene oxide random copolymers. The oxyethylene/oxypropylene weight ratio is generally from 10:90 to 90:10, preferably from 25:75 to 75:25 and more preferably from 40:60 to 60:40.

The copolymerization of ethylene oxide, propylene oxide and/or butylene oxide is preferably carried out in the presence of a DMC catalyst.

Suitable DMC catalysts prepared have e.g. formula (I)

  (I), where $M^1$ is a metal ion selected from the group consisting of Zn2+, Fe2+, Co3+, Ni2+, Mn2+, Co2+, Sn2+, Pb2+, Mo4+, Mo6+, Al3+, V4+, V5+, Sr2+, W4+, W6+, Cr2+, Cr3+, Cd2+, Hg2+, Pd2+, Pt2+, V2+, Mg2, Ca2+, Ba2+, Cu2+, $M^2$ is a metal ion selected from the group consisting of Fe2+, Fe3+, Co2+, Co3+, Mn2+, Mn3+, V4+, V5+, Cr2+, Cr3+, Rh3+, Ru2+, Ir3+, and $M^1$ and $M^2$ are identical or different, A is an anion selected from the group consisting of halide, hydroxide, sulfate, carbonate, cyanide, thiocyanate, isocyanate, cyanate, carboxylate, oxalate or nitrate, X is an anion selected from the group consisting of halide, hydroxide, sulfate, carbonate, cyanide, thiocyanate, isocyanate, cyanate, carboxylate, oxalate and nitrate, L is a water-miscible ligand selected from the group consisting of alcohols, aldehydes, ketones, ethers, polyethers, esters, polyesters, polycarbonate, ureas, amides, nitriles and sulfides, and a, b, c, d, g and n are selected so that the compound is electrically neutral, and e is the coordination number of the ligand, a fraction or an integer greater than or equal to 0, f is a fraction or inter greater than or equal to 0 and h is a fraction or integer greater than or equal to 0, where the multimetal cyanide compounds of the formula (I) are preferably crystalline.

Preference is here given to crystalline multimetal cyanide compounds in which $M^1$ is Zn(II) and $M^2$ is Co(III). This preferred class of multimetal cyanide compounds will hereinafter be referred to as zinc hexacyanocobaltates.

Within the class of zinc hexacyanocobaltates, there are in turn embodiments of the formula (I) which are particularly preferred.

Particular preference is given to crystalline multimetal cyanide compounds in which the anion X is formate, acetate or propionate and f is then greater than 0 and which have X ray diffraction patterns as are described in DE 197,42,978. Among these compounds, preference is in turn given to those in which the anion X is acetate and in particular to those which crystallize in a monoclinic crystal system.

Among these multimetal cyanide compounds in which $M^1$ is Zn(II), $M^2$ is Co(III), and X is acetate and which have a monoclinic crystal system, there are further preferred embodiments in respect of the morphology of the primary crystals. Preference is given to platelet-shaped multimetal cyanide compounds, i.e. multimetal cyanide compounds in which the length and width of the primary crystallites are at least three times as great as the thickness of the primary crystallites.

The preferred preparative process for preparing the DMC catalysts comprises at least two steps:

(a) precipitation of a multimetal cyanide phase, hereinafter referred to as precursor phase, by reaction of a metal salt with a cyanometalate compound (precipitation step), and (b) recrystallization of the multimetal cyanide precursor phase to convert it into the desired catalytically active multimetal cyanide phase, which will hereinafter be referred to as catalyst phase (recrystallization step).

A multimetal cyanide phase is a multimetal cyanide compound having a particular crystal structure.

The precipitation of the multimetal cyanide precursor phase is carried out, as described in the literature, by combining an aqueous solution of a metal salt $M^f_g X_n$, where $M^1$, X, g and n are as defined for formula I, with an aqueous cyanometalate solution, comprising at least one cyanometalate compound of the formula $B_x[M^2(CN)_b(A)_c]_z$, where B is an alkali metal, an alkaline earth metal and/or hydrogen, $M^2$, A, b and c are as defined for formula I and x and z are numbers greater than zero. B is particularly preferably hydrogen, as described in EP 862,947.

Corresponding to the above-described preferred multimetal cyanide catalyst phases, preferred metal salts are zinc carboxylates, in particular zinc fortunate, zinc acetate and zinc propionate.

Furthermore, one or both of the aqueous solutions may, if desired, further comprise at least one organic ligand L selected from the above-described classes of substances or as described in WO 98/16,310, page 6, lines 13-26, and/or ad least one surface-active substance. The surface-active compounds used can be, in particular, anionic, cationic, nonionic and/or polymeric surfactants.

In particular, use is made of nonionic and/or polymeric surfactants. Among this group, particular preference is given to fatty alcohol alkoxylates, block copolymers of various epoxides having differing hydrophilicity, castor oil alkoxylates or block copolymers of epoxides and other monomers, e.g. acrylic acid or methacrylic acid. The substances used should have a moderate to good solubility in water.

Fatty alcohol alkoxylates can be prepared by reacting a fatty alcohol, preferably one having 8-36 carbon atoms, in particular 10-18 carbon atoms, with ethylene oxide, propylene oxide and/or butylene oxide. The polyether part of the fatty alcohol alkoxylate can consist of pure ethylene oxide, propylene oxide or butylene oxide polyethers. Also possible are copolymers of two or three different alkylene oxides or block copolymers of two or three different alkylene oxides. Fatty alcohol alkoxylates which have pure polyether chains are, for example, the Lutensol® AO and Lutensol® TO products from BASF AG. Fatty alcohol alkoxylates having block copolymers as polyether part are Plurafac® LF products from BASF AG. The polyether chains particularly preferably consist of from 2 to 50, in particular 3-15, alkylene oxide units.

Block copolymers as surfactants comprise two different polyether blocks which have differing hydrophilicities. Block copolymers which can be may comprise ethylene oxide and propylene oxide (Pluronic® products, BASF AG). The solubility in water is controlled via the lengths of the various blocks. The molar masses of these compounds are usually in the range from 500 Da to 20,000 Da, preferably from 1000 Da to 6000 Da and in particular 1500-4000 Da. In the case of ethylene oxide/propylene oxide copolymers, the ethylene oxide content is from 5 to 50% by weight and the propylene oxide content is from 50 to 95% by weight.

Alkylene oxide copolymers with other monomers preferably have ethylene oxide blocks. Other monomers can be, for example, butyl methacrylate (PBMA/PEO BE1010/BE1030, Th. Goldschmidt), methyl methacrylate (PMMA/PEO ME1010/ME1030, Thn. Goldschmidt) or methacrylic acid (EA-3007, Th. Goldschmidt).

The surface-active compounds are generally not incorporated into the structure of the multimetal cyanide compounds nor bound in the form of a complex and can be washed out after the multimetal cyanide compounds have been prepared.

The aqueous cyanometalate solution preferably has an $M^2$ content of from 0.1 g/l to 100 g/l, preferably from 1 g/l to 20 g/l, particularly preferably from 5 g/l to 15 g/l.

The $M^1$ content of the metal salt solution is from 0.1% by weight to 10% by weight, preferably from 1% by weight to 5% by weight, based on the mass of metal salt solution.

In a preferred embodiment of the preparative process, the precipitation step is carried out by initially charging the cyanometalate solution and adding the metal salt solution. The amount of metal salt solution is chosen so that the multimetal cyanide precursor phase can be produced.

The temperature in the preparative step is preferably in the range from 20 to 95° C., in particular from 35 to 80° C. The metal salt solution is preferably metered in over a period of from 5 minutes to 5 hours, in particular from 30 minutes to 3 hours.

The ratio of $M^1:M^2$ in the precipitation step is, depending on the desired precursor compound, from 1:1 to 3:1. In the preparation of multimetal cyanide compounds in which $M^1$ is Zn(II), $M^2$ is Co(III), and X is formate, acetate or propionate, preferably those in which X is acetate and which have a monoclinic crystal system, a zinc hexacyanocobaltate phase crystallizing in a cubic crystal system is precipitated in the precipitation step according to the present invention. In this case, the $M^1:M^2$ ratio is preferably 1.5:1.

The actually desired multimetal cyanide catalyst phase is then produced in the second process step as described above, also referred to as the recrystallization step. The recrystallization step can immediately follow the first process step, namely the precipitation step. However, the precipitation and recrystallization steps can also be separate from one another in space and/or time.

In the recrystallization step, the multimetal cyanide precursor phase prepared in the precipitation step is recrystallized to form the multimetal cyanide compound having the desired crystal structure by setting appropriate conditions.

The phases of the multimetal cyanide compounds which are present after the first step or the second step naturally have to differ in at least one measurable property, e.g. composition, X-ray diffraction pattern, morphology, particle size or agglomeration.

To set the conditions suitable for the recrystallization, alterations are made, for example, in the temperature and/or the pH of the precipitation suspension and/or the ratio $M^1:M^2$ (by addition of metal salt solution and/or cyanometalate solution). Changes in the ratio $M^1:M^2$ may also lead to changes in the absolute concentration of $M^1$ and $M^2$. The solutions added to change the ratio $M^1:M^2$ may also contain water-miscible substances such as ligands L and/or surface-active substances. Moreover, additional water-miscible substances such as the ligands L and/or surface-active substances can be added between the precipitation step and the recrystallization step.

In a further embodiment, it is possible to separate the multimetal cyanide precursor phase from the precipitation suspension and to resuspend the resulting solid for the recrystallization.

Furthermore, the metal salt solutions used in the precipitation and recrystallization do not have to be the same. They can differ either in the metal salt, the concentration or the possible addition of ligands L and/or surface-active substance. This applies equally to the cyanometalate solution. In this embodiment of the process of the present invention, it is possible for the metals in the multimetal cyanide compound to be partially exchanged.

In the recrystallization, either the compound from the precipitation step is resuspended in water and initially charged and, if a change in the $M^1:M^2$ ratio is necessary for the recrystallization, the appropriate amount of metal salt solution or cyanometalate solution is added, or the metal salt solution or cyanometalate solution is initially charged and the multimetal cyanide precursor phase dispersed in liquid is added. The addition can take from 2 minutes to 5 hours, preferably from 15 minutes to 2 hours.

The temperatures employed in the recrystallization are in the range from 20° C. to 95° C., preferably from 40° C. to 90° C. The temperature in the recrystallization is generally different from the temperature in the precipitation. However, should both precipitation and recrystallization be carried out at the same temperature, this is preferred for process engineering reasons.

The $M^1:M^2$ ratio in the recrystallization can be from 1:10 to 10:1, but is preferably from 1.5:1 to 3:1.

In the case of the preparation of the preferred multimetal cyanide catalyst phases in which $M^1$ is Zn(II), $M^2$ is Co(III), and X is acetate and which have a monoclinic crystal structure and are produced by recrystallization of a cubic precursor phase, the $M^1:M^2$ ratio in the recrystallization is greater than 1.9:1 and preferably in the range from 2:1 to 3:1. In this case, zinc acetate is used as metal salt.

In order to obtain the primary crystallites of this preferred multimetal cyanide catalyst phase in platelet form, fatty alcohol alkoxylates, preferably fatty alcohol ethoxylates, or ethylene oxide/propylene oxide block copolymers are preferably added as surface-active substances. The surface-active substances can be added either in the precipitation step or in the recrystallization step. The surface-active substances are preferably added after the precipitation step and before the recrystallization step.

The course of the recrystallization can, if microscopically measurable parameters change, be followed by means of measurements. Such parameters may be the pH or the surface area of the solid. The change in the surface area of the solid can be followed by light scattering.

The multimetal cyanide catalysts prepared according to the present invention have a very low degree of agglomeration 90% of the particles have a particle size (which can be determined by laser light scattering) in the range from 0.1 μm to 100 μm, preferably in the range from 0.1 μm to 30 μm, particularly preferably from 0.1 μm to 20 μm. The catalyst of the present invention has an X50 value of the measured particle size distribution of less than 20 μm, preferably less than 15 μm, in particular less than 10 μm.

The alkylene oxide random copolymers of the present invention can be prepared by initially charging a stirred reactor with the monool initiator and the DMC catalyst and dispersing the catalyst in the initiator. The reactor content is preferably dessicated at elevated temperature and the reactor purged with an inert gas thereafter. The alkylene oxides, preferably ethylene oxide and propylene oxide are then added in parallel at a temperature of preferably from 110 to 150° C. After the addition of the alkylene oxides is finished, the reaction is preferably continued until constant pressure is reached. The reaction mixture is cooled, the reactor purged with nitrogen and finally evacuated. The catalyst can be removed from the product by filtration or the catalyst can remain in the product. For catalyst removal, the product can be diluted with a solvent, such as toluene, acetone or ethyl acetate and the solvent be evaporated after the catalyst has been filtered off.

The initial charging of the reactor can also be a suspension of the catalyst in a solvent, such as toluene, or a suspension of catalyst and the monool or diol initiator in a solvent. During the addition of the alkylene oxides some amount, typically from 40 to 95%, of the monool or diol initiator can be added in parallel.

Preferred copolymers according to the invention have a viscosity at 50° C. of greater than 20 mm$^2$/s, preferably greater than 80 mm$^2$/s, more preferably from 80 to 2500 mm$^2$/s, determined according to DIN 51562. A viscosity index greater than 200, determined according to ASTM D2270-74, is likewise preferred. In a further preferred embodiment, less copolymers have a pour point, determined according to DIN 51597, of less than −30° C. Preferred copolymers have an average molecular weight $M_w$ of more than 800 g/mol, more preferably of more than 2300 g/mol particularly preferably of from 2300 to 20 000 g/mol.

The invention furthermore relates to the use of the alkylene oxide copolymers of the invention in functional fluid formulations. The alkylene oxide copolymers of the invention are in particular used in functional fluid formulations to reduce the inhalation toxicity of the functional fluid formulations.

Preferred functional fluids in which the copolymers of the invention are used are industrial lubricants, automotive lubricants, marine lubricants and aviation lubricants. Functional fluids in which the copolymers of the invention are used are in particular lubricant for fiber production, hydraulic fluids, gear oils, compressor fluids, turbine oils, metal working fluids, greases, bearing lubricants, wire lubricants and engine oils. Specific functional fluids in which the copolymers of the invention are used are quenchant fluids and lubricants for fiber production, anhydrous hydraulic fluids water glycol hydraulic fluids, metalworking fluids, gear lubricants compressor lubricants, refrigeration lubricants, mill and calender lubricants, brake fluids, 4-stroke engine oils, 2-cycle engine lubricants, mandrel or mold release lubricants for processing of rubber based elastomers, grease lubricants and universal transmission lubricants.

The invention further relates to low inhalation toxicity lubricants for fiber production containing the copolymers of the invention having a low unsaturation degree.

Alkylene oxide copolymers play an important role in spin-finishes for the production of fibres. They are mainly used in the production of filament yarns. Two objectives are most important for the spin-finish formulation: It produces cohesion of the fibres and it provides good fibre-metal-lubrication. Furthermore a good spin-finish formulation avoids problems in fibre production by its antistatic and anticorrosive properties. Further additives are usually added for stabilization, like biocides and antioxidants, or to improve the wetting of the spin-finish formulation on the fibre.

Polyalkylene glycols, preferably butanol initiated EO/PO random copolymers, are chosen as a main component in spin-finish formulations, because they show good lubricating properties, are antistatic and non corrosive. They are not volatile, leave no residue on thermal decomposition and do not lead to discoloration of the fibres. After the fibre production polyalkylene glycols can be removed easily, because of their good water solubility. Usually an emulsifier is added to aid the dissolving process in water.

A major problem in the production of fibres was the formation of aerosols, caused by the high speed of production, combined with the high inhalation toxicity of the preferred prior art polyalkylene glycols, in particular of the butanol initiated EO/PO random copolymers used in current formulations. The lubricant of the present invention avoids these problems of inhalation toxicity, because it is based on copolymers with low inhalation toxicity.

Preferred low inhalation toxicity lubricants for fiber production contain a) 65-95 wt.-% of the copolymer which is obtainable by copolymerizing ethylene oxide, propylene oxide and/or butylene oxide with an initiator monool or diol, said copolymer having a degree of unsaturation of less than about 0.01 meq/g;

b) 3-20 wt.-% emulsifiers, such as fatty alcohol alkoxylates, castor oil ethoxylates or fatty amine ethoxylates;

c) 0-5 wt.-% antistatic agents, such as sulfates, sulfonates or betaines;

d) 0-5 wt.-% corrosion inhibitors, such as phosphonates or oleylsarcosinate;

e) 0-5 wt.-% further additives, such as stabilizers, antioxidants, biozides or wetting agents.

Preferably, the low inhalation toxicity lubricants for fiber production contain the components c)-e) in an amount of at least 0.01 wt.-% each.

The formulation is diluted with water, so that the final aqueous formulation contains from 10% to 90% of water.

The invention further relates to low inhalation toxicity hydraulic fluids containing the copolymers of the invention having a low unsaturation degree.

Hydraulic systems are used frequently in all aspects of everyday life. Polyalkylene glycols, preferably butanol initiated EO/PO random copolymers are used as basestocks and components in hydraulic fluids because of their excellent lubrication properties. As a polymer class they are more fire resistant than mineral oil fluids and so are especially used in fire resistant hydraulic fluid formulations in industries where constant sources of ignition are present such as steel manufacture and aluminum diecasting.

Preferred low inhalation toxicity anhydrous hydraulic fluids of the invention contain
a) 75-98 wt.-% preferably 90-97 wt.-% of a copolymer which is obtainable by copolymerizing ethylene oxide, propylene oxide and/or butylene oxide with an initiator monool or diol, said copolymer having a degree of unsaturation of less than about 0.01 meq/g;
b) 0-5 wt.-% preferably 0.2-1 wt.-% metal passivators such as tolyltriazole, benzothiazole and benzotriazole;
c) 0-5 wt.-% preferably 0.5-3 wt.-% antioxidants, such as dialkylthiopropionates, organic amines and hindered phenols, e.g. dilaurylthiopropionate, dioctyldiphenylamine, phenylnapthylamine, phenothiazine and butylated hydroxytoluene;
d) 0-5 wt.-% preferably 0.5-2 wt.-% corrosion inhibitors such as organic acids and esters thereof, nitrogen-, phosphorous-, and sulfur containing compounds, succinic acid derivatives, 4-nonylphenoxyacetic acid, alkyl and aryl phosphites;
e) 0-5 wt.-% preferably 0.3-2 wt.-% antiwear and extreme pressure additives such as dithiophosphates, amine phosphates, phosphorothionates, carbamates, alkyl and aryl phosphates;
f) 0-5 wt.-% preferably 0.2-2 wt.-% further additives such as dispersants, seal swell improvers, defoamers, stabilizers and dyes.

Preferred low inhalation toxicity water glycol hydraulic fluids contain
a) 30-60 wt.-% preferably 35-50 wt.-% of a copolymer which is obtainable by copolymerizing ethylene oxide, propylene oxide and/or butylene oxide with an initiator monool or diol, said copolymer having a degree of unsaturation of less than about 0.01 meq/g;
b) 0-40 wt.-% preferably 0-20 et.-% glycol such as ethylene glycol, diethylene glycol and propylene glycol;
c) 20-45 wt.-% preferably 25-40 wt.-% water;
d) 0-15 wt.-% preferably 2-10 wt.-% polyalkylene thickener such as trimethylolpropane initiated ethylene oxide-propylene oxide heteric polymer;
e) 0-5 wt.-% preferably 0.2-1 wt.-% metal passivators such as tolyltriazole, benzothiazole and benzotriazole;
f) 0-5 wt.-% preferably 0.5-3 wt.-% antioxidants such as dialkylthiopropionates, organic amines and hindered phenols e. g. dilaurylthiopropionate, dioctyldiphenylamine, phenylnaphthylamine, phenothiazine and butylated hydroxytoluene;
g) 0-5 wt.-% preferably 0.5-2 wt.-% corrosion inhibitors such as organic acids and esters thereof, nitrogen-, phosphorous-, and sulfur containing compounds, succinic acid derivatives, 4-nonylphenoxyacetic acid and alkyl amines;
h) 0-5 wt.-% preferably 0.8-3 wt.-% boundary lubricants such a carboxylic acids and fatty amines;
i) 0-5% preferably 0.2-1 wt.-% further additives such as defoamers and dyes.

The invention further relates to metalworking fluids containing the copolymers of the invention having a low unsaturation degree.

Polyalkylene glycols, preferably butanol initiated EO/PO random copolymers have been successfully used base fluids for water soluble metal cutting and grinding fluids. They have also been used as lubricants in forming operations such as stamping, rolling and drawing. Metal working operations take advantage of a unique property of polyalkylene glycols which is inverse solubility. This means the polymer becomes less soluble in water as the temperature of the solution increases. When the polyalkylene glycol polymer comes in contact with hot metal it comes out of solution and coats the metal part with a concentrated film providing excellent lubricity.

Preferred metalworking fluids of the invention contain
a) 25-55 wt.-% preferably 30-45 wt.-% of a copolymer which is obtainable by copolymerizing ethylene oxide, propylene oxide and/or butylene oxide with an initiator monool or diol, said copolymer having a degree of unsaturation of less than about 0.01 meq/g;
b) 36-65 wt.-% preferably 45-60 wt.-% water;
c) 5-26 wt.-% preferably 10-20 wt.-% metal passivators and corrosion inhibitors such as tolyltriazole, benzotriazole, organic acids, esters thereof, nitrogen-, phosphorous- and sulfur containing compound, alkyl and aryl phosphites;
d) 0-5 wt.-% preferably 0.2-1 wt.-% antioxidants such as dialkylthiopropionates, organic amines and hindered phenols such as butylated hydroxytoluene;
e) 0-5 wt.-% preferably 0.3-2 wt.-% antiwear and extreme pressure additives such as dithiophosphates, amine phosphates, alkyl and aryl phosphates and carboxylic acids;
f) 0-5 wt.-% preferably 0.5-2 wt.-% further additives such as dispersants, defoamers and stabilizers.

The invention further relates to low inhalation toxicity gear lubricants containing the copolymers of the invention having a low unsaturation degree.

Proper gear lubrication is integral to the proper maintenance of transmissions. Polyalkylene glycols, preferably butanol initiated EO/PO random copolymers when formulated with necessary additives provides very good lubrication, stability and transmission service life. Due to their broad viscosity range, formulations based on butanol initiated EO/PO random copolymers have been successfully used in helical, herringbone, bevel, spiral bevel, spur and worm gear applications.

Preferred low inhalation toxicity gear lubricants of the invention contain
a) 75-98 wt.-% preferably 90-97 wt.-% of a copolymer which is obtainable by copolymerizing ethylene oxide, propylene oxide and/or butylene oxide with an initiator monool or diol, said copolymer having a degree of unsaturation of less than about 0.01 meq/g;
b) 0-5 wt.-% preferably 0.2-1 wt.-% metal passivators such as tolyltriazole, benzothiazole and benzotriazole;
c) 0-5 wt.-% preferably 0.5-3 wt.-% antioxidants such as dialkylthiopropionates, organic amines and hindered phenols, e. g. dilaurylthiopropionate, dioctyldiphenylamine, phenylnaphthylamine, phenothiazine and butylated hydroxytoluene;

d) 0-5 wt.-% preferably 0.5-2 wt.-% corrosion inhibitors such a organic acids, esters thereof, nitrogen-, phosphorous-, and sulfur containing compounds, succinic acid derivatives, 4-nonylphenoxyacetic acid, alkyl and aryl phosphites;

e) 0-5 wt.-% preferably 0.2-2 wt.% antiwear and extreme pressure additives such as dithiophosphates, amine phosphates, phosphorothionates, carbamates, alkyl and aryl phosphates;

f) 0-5 wt.-% preferably 0.5-2 wt.-% further additives including dispersants, anti-foam agents and stabilizers.

The invention further relates to low inhalation toxicity compressor lubricants containing the copolymers of the invention having a low unsaturation degree.

Polyalkylene, preferably butanol initiated EO/PO random copolymers are used as base fluids for formulated compressor lubricants. Due to their high temperature stability, lubricity and resistance to sludge said formulations are used in centrifugal, reciprocating, sliding vane and rotary screw compressors for applications including helium, hydrogen, nitrogen, carbon dioxide, natural gas, and ethylene.

Preferred low inhalation toxicity compressor lubricants of the invention contain a) 75-98 wt.-% preferably 90-97 wt.-% of a copolymer which is obtainable by copolymerizing ethylene oxide, propylene oxide and/or butylene oxide with an initiator monool or diol, said copolymer having a degree of unsaturation of less than about 0.01 meq/g;

b) 0-5 wt.-% preferably 0.2-1 wt.-% metal passivators such as tolyltriazole, benzothiazole and benzotriazole;

c) 0-5 wt.-% preferably 0.5-3 wt.-% antioxidants such as dialkylthiopropionates, organic amines and hindered phenols such as dilaurylthiopropionate, dioctyldiphenylamine, phenylnaphthylamine, phenothiazine and butylated hydroxytoluene;

d) 0-5 wt.-% corrosion inhibitors such as organic acids, esters thereof, nitrogen-, phosphorous-, and sulfur containing compounds, succinic acid derivatives, 4-nonylphenoxyacetic acid, alkyl and aryl phosphites;

e) 0-5 wt.-% antiwear and extreme pressure additives such as dithiophosphates, amine phosphates, phosphorothionates, carbamates, alkyl and aryl phosphates;

f) 0-5 wt.-% further additives such as dispersants, antifoam additives including polydimethylsiloxanes and polyalkylene glycols, and stabilizers.

Preferably, the low inhalation toxicity compressor lubricants of the invention contain the components d)-f) in an amount of at least 0.01 wt.-% each.

The invention further relates to low inhalation toxicity refrigeration lubricants containing the copolymers of the invention having a low unsaturation degree.

The Montreal Protocol in 1987 initiated the phase out of the use of chlorofluorocarbons due to their adverse effect on the earth's ozone layer. In mobile air conditioning refrigerant R-134a was chosen as a non-ozone depleting replacement. In mobile air conditioning units the lubricant travels through the system with the refrigerant. Butanol initiated EO/PO random copolymers are soluble in R-134a and are widely used as the basestock for mobile air conditioning lubricants because of this solubility and excellent lubricity.

Preferred low inhalation toxicity refrigeration lubricants of the invention contain a) 75-98 wt.-% preferably 90-97 wt.-% of a copolymer which is obtainable by copolymerizing ethylene oxide, propylene oxide and/or butylene oxide with an initiator monool or diol, said copolymer having a degree of unsaturation of less than about 0.01 meq/g;

b) 0-5 wt.-% preferably 0.2-1 wt.-% metal passivators such as tolyltriazole, benzothiazole and benzotriazole;

c) 0-5 wt.-% preferably 0.5-3 wt.-% antioxidants such as dialkylthiopropionates, organic amines and hindered phenols including dilaurylthiopropionate, dioctyldiphenylamine, phenylnaphthylamine, phenothiazine and butylated hydroxytoluene and phenothiadine;

d) 0-5 wt.-% preferably 0.5-2 wt.-% corrosion inhibitors such as organic acids, esters thereof, nitrogen-, phosphorous- and sulfur containing compounds, succinic acid derivatives, 4-nonylphenoxyacetic acid, alkyl and aryl phosphites;

e) 0-5 wt.-% preferably 0.2-2 wt.-% antiwear and extreme pressure additives such as dithiophosphates, amine phosphates, phosphorothionates, carbamates, alkyl and aryl phosphates, e.g. tricreasyl phosphate;

f) 0-2 wt.-% preferably 0.1-0.5 wt.-% anti-foam additives such as polydimethylsiloxanes and polyalkylene glycols;

g) 0-5 wt.-% preferably 1-3 wt.-% stabilizers such as neopropylene glycol diglycidylether, polypropylene glycol diglycidylether, phenyl glycidylether and cycloalphatic epoxy compounds;

h) 0-5 wt.-% preferably 2-4 wt.-% further additives such as viscosity index improvers, pour point depressants, detergents and dispersants.

The invention further relates to low toxicity mill and calendar lubricants containing the copolymers of the invention having a low unsaturation degree.

In textile, rubber, paper and plastic industries large mills and calendars are used, requiring lubrication of journal and anti-friction bearings. These lubricants must operate at high temperatures of >150° C. Polyalkylene glycol, preferably butanol initiated EO/PO random copolymers form volatile chemical compounds when thermally decomposed and do not form carbonaceous residues as mineral oils do which can inhibit proper lubricant performance.

Preferred low toxicity mill and calendar lubricants of the invention contain a) 75-98 wt.-% preferably 90-97 wt.-% of a copolymer which is obtainable by copolymerizing ethylene oxide, propylene oxide and/or butylene oxide with an initiator monool or diol, said copolymer having a degree of unsaturation of less than about 0.01 meq/g;

b) 0-5 wt.-% preferably 0.2-1 wt.-% metal pass a such as tolyltriazole, benzothiazole and benzotriazole;

c) 0-5 wt.-% preferably 0.5-3 wt.-% antioxidants such as dialkylthiopropionates, organic amines and hindered phenols, e.g. as dilaurylthiopropionate, dioctyldiphenylamine, phenylnaphthylamine, phenothiazine and butylated hydroxytoluene;

d) 0-5 wt.-% preferably 0.5-2 wt.-% corrosion inhibitors such as organic acids, esters thereof, nitrogen-, phosphorous- and sulfur containing compounds, succinic acid derivatives, 4-nonylphenoxyacetic acid, alkyl and aryl phosphites;

e) 0-5 wt.-% preferably 0.2-2 wt.-% antiwear and extreme pressure additives such as dithiophosphates, amine phosphates, phosphorothionates, carbamates, alkyl and aryl phosphates;

f) 0-5 wt.-% preferably 1-4 wt.-% further additives including dispersants, defoamers, stabilizers, viscosity index improvers and detergents.

The invention further relates to low inhalation toxicity DOT 3 brake fluids containing the copolymers of the invention having a low unsaturation degree.

Polyalkylene glycols, preferably butanol initiated EO/PO random copolymers are suitable base fluids for DOT 3 brake formulations because of their lubricity, thermal and oxidative stability.

Preferred low inhalation toxicity DOT 3 brake fluids contain a) 50-99 wt.-% of a copolymer which is obtainable by copolymerizing ethylene oxide, propylene oxide and or butylene oxide with an initiator monool or diol, said copolymer having a degree of unsaturation of less than about 0.01 meq/g;
b) 0-30 wt.-% glycol ethers such as methyl triethylene glycol ether and butyl triethylene glycol ether;
c) 0-20 wt.-% glycols such as triethylene glycol;
d) 0-5 wt.-% metal passivators; such as tolyltriazole, benzothiazole and benzotriazole;
e) 0-5 wt.-% antioxidants such as dialkylthiopropionates, organic amines and hindered phenols, e.g. dilaurylthiopropionate, dioctyldiphenylamine, phenylnaphthylamine, phenothiazine and butylated hydroxytoluene;
f) 0-5 wt.-% corrosion inhibitors such as organic acids, esters thereof, nitrogen-, phosphorous- and sulfur containing compounds, succinic acid derivatives, 4-nonylphenoxyacetic acid, alkyl and aryl phosphites;
g) 0-5 wt.-% antiwear and extreme pressure additives, such as dithiophosphates, amine phosphates, phosphorothionates, carbamates, alkyl and aryl phosphates;
h) 0-5 wt.-% further additives such as defoamers, viscosity index improvers, pour point depressants, detergents and dispersants.

Preferably, the low inhalation toxicity DOT 3 brake fluids of the invention contain the components b)-h) in an amount of at least 0.01 wt.-% each.

The invention further relates to low inhalation toxicity 4-stroke engine oils containing the copolymers of the invention having a low unsaturation degree.

Polyalkylene glycols, preferably butanol initiated EO/PO random copolymers may be used as base fluids in lubricant formulation for 4-stroke engines affording the finished lubricant excellent lubricity, thermal and oxidative stability, and resistance to forming sludges and carbonaceous residues as mineral oil fluids do at high operating temperatures. Formulations based on said polymers also show better lubricity than polyalphaolefin based synthetic engine oils.

Preferred low inhalation toxicity 4-stroke engine oils of the invention contain a) 85-98 wt.-% preferably 90-97 wt.-% of a copolymer which is obtainable by copolymerizing ethylene oxide, propylene oxide and/or butylene oxide with an initiator monool or diol, said copolymer having a degree of unsaturation of less than about 0.01 meq/g;
b) 0-5 wt.-% preferably 0.2-1 wt.-% metal passivators such as tolyltriazole, benzothiazole and benzotriazole;
c) 0-5 wt.-% preferably 0.5-3 wt.-% antioxidants such as dialkylthiopropionates, organic amines and hindered phenols, e. g. dilaurylthiopropionate, dioctyldiphenylamine, phenylnaphthylamine, phenothiazine and butylated hydroxytoluene;
d) 0-5 wt.-% preferably 0.5-2 wt.-% corrosion inhibitors such as organic acids, esters thereof, nitrogen-, phosphorous- and sulfur containing compounds, succinic acid derivatives, 4-nonylphenoxyacetic acid, alkyl and aryl phosphites and alkyl amines;
e) 0-5 wt.-% preferably 0.5-3 wt.-% detergents such as calcium and magnesium sulfonates, salicylate;
f) 0-5 wt.-% preferably 0.3-2 wt.-% antiwear and extreme pressure additives such as dithiophosphates, amine phosphates, phosphorothionates, carbamates, alkyl and aryl phosphates;
g) 0-5 wt.-% preferably 0.5-3 wt.-% further additives such as dispersants, anti-foam additives, friction modifiers and anti-misting agents.

The invention further relates to low inhalation toxicity 2-cycle engine lubricants containing the copolymers of the invention having a low unsaturation degree.

Formulations based on polyalkylene glycols, preferably butanol initiated EO/PO random copolymers are well suited to lubrication of air cooled two-stroke cycle engines. The characteristic clean burn off of these polyalkylene glycol polymers greatly reduces the problems related to combustion chamber deposits, and spark plug fouling. Polyalkylene glycols, preferably butanol initiated EO/PO random copolymers polymers are completely miscible with methanol and methanol/nitromethane mixtures.

Preferred low inhalation toxicity 2-cycle engine lubricants of the invention contain a) 85-98 wt.-% preferably 90-97 wt.-% of a copolymer which is obtainable by copolymerizing ethylene oxide, propylene oxide and/or butylene oxide with an initiator monool or diol, said copolymer having a degree of unsaturation of less than about 0.01 meq/g;
b) 0-5 wt.-% preferably 0.2-1 wt.-% metal passivators such as tolyltriazole, benzothiazole and benzotriazole;
c) 0-5 wt.-% preferably 0.5-3 wt.-% antioxidants such as dialkylthiopropionates, organic amines and hindered phenols, e. g. dilaurylthiopropionate, dioctyldiphenylamine, phenylnaphthylamine, phenothiazine and butylated hydroxytoluene;
d) 0-5 wt.-% preferably 0.5-2 wt.-% corrosion inhibitors such as organic acids, esters thereof, nitrogen-, phosphorous- and sulfur containing compounds, succinic acid derivatives, 4-nonylphenoxyacetic acid, alkyl and aryl phosphites and alkyl amines;
e) 0-5 wt.-% preferably 0.5-3 wt.-% detergents such as calcium and magnesium sulfonates, salicylate;
f) 0-5 wt.-% preferably 0.3-2 wt.-% antiwear and extreme pressure additives such as dithiophosphates, amine phosphates, phosphorothionates, carbonates, alkyl and aryl phosphates;
g) 0-5 wt.-% preferably 0.5-3 wt.-% further additives such as dispersants, anti-foam additives, friction modifiers and anti-misting agents.

The invention further relates to low inhalation toxicity mandrel or mold release lubricants containing the copolymers of the invention having a low unsaturation degree.

Polyglycols have minimal swelling effects on most natural and synthetic rubbers. For this reason and their excellent lubricity, polyglycols are ideal basestocks for mandrel and rubber lubricants and in addition mold release lubricants. In many cases the lubricant is diluted with water or some other water soluble solvent. Their inverse solubility may be used in aqueous systems to recover the recover the polymer for reuse.

Preferred low inhalation toxicity mandrel or mold release lubricants of the invention for processing of rubber based elastomers contain a) 90-99 wt.-% preferably 94-98 wt.-% of a copolymer which is obtainable by copolymerizing ethylene oxide, propylene oxide and/or butylene oxide with an initiator monool or diol, said copolymer having a degree of unsaturation of less than about 0.01 meq/g;
b) 0-5 wt.-% preferably 1-3 wt.-% antioxidants such as dialkylthiopropionates, organic amines and hindered phenols, e. g. N-n-butyl-para-aminophenol, N,N'-dimethyl-para-phenylenediamine, phenothiazine and butylated hydroxytoluene;

c) 0-5 wt.-% preferably 1-3 wt.-% further additives such as defoamers, detergents and stabilizers.

The invention further relates to low inhalation toxicity quenchant fluids containing the copolymers of the invention having a low unsaturation degree.

Quenchants are used to impart specific properties to metal parts, particularly steel. The two most common quenchants are water and mineral oil however for many applications they cool the metal too fast or too slow respectively. Mineral oil have additional disadvantages of limited varaiability in quench rates, smoke emissions, flammability and disposal problems. Synthetic polymer quenchants can be formulated to give a wide range of quenchants rates intermediate between water and mineral oil. Quench formulations based on polyalkylene glycols are the most widely used polymer quenchant because of their quench performance providing decreased cracking and residual stress and in addition they are fire resistant.

Preferred low inhalation toxicity quenchant fluids of the invention contain a) 1-35 wt.-% preferably 5-15 wt.-% of a copolymer which is obtainable by copolymerizing ethylene oxide, propylene oxide and/or butylene oxide with an initiator monool or diol, said copolymer having a degree of unsaturation of less than about 0.01 meq/g;

b) 65-95 wt.-% preferably 82-94.5 wt.-% water;

c) 0-5 wt.-% preferably 0.1-1 wt.-% corrosion inhibitors such as organic acids, alkyl amines, esters thereof, nitrogen-, phosphorous- and sulfur containing compounds, and succinic acid derivatives;

d) 0-5 wt.-% preferably 0.1-1 wt.-% further additives such as dispersants, defoamers and stabilizers.

The invention further relates to low inhalation to toxicity grease lubricants containing the copolymers of the invention having a low unsaturation degree.

Greases are used in applications where the lubricant must be retained in the required area and specifics of the application make this impossible or impractical for liquid lubricants. Other advantages of greases include: no splattering, less frequent applications, less expensive seals can be used, easier to handle, adhere better to surfaces and can reduce noise and vibration. Polyglycols can be used to produce excellent conventional greases but also specialty greases taking advantage of the unique properties of polyglycols including a water soluble grease or a grease that is resistant to mineral oil.

Preferred low inhalation toxicity grease lubricants of the invention contain a) 40-85 wt.-% of a copolymer which is obtainable by copolymerizing ethylene oxide, propylene oxide and/or butylene oxide with an initiator monool or diol, said copolymer having a degree of unsaturation of less than about 0.01 meq/g;

b) 0-45 wt.-% butanol initiated polypropylene glycol;

c) 5-15 wt.-% thickeners such as lithium, calcium and sodium soaps, complex soaps, and treated bentonite—type aluminosilicate clay and highly dispersed silicic acid;

d) 0-5 wt.-% metal passivators such as tolyltriazole, benzothiazole and benzotriazole;

e) 0-5 wt.-% antioxidants, including organic amines and hindered phenols;

f) 0-5 wt.-% corrosion inhibitors such as disodium sebacate, alkenyl succinic acid esters, imidazoline and sarcosine derivatives, sodium and calcium sulfonates;

g) 0-5 wt.-% antiwear and extreme pressure additives such as dithiophosphates, dithiocarbamates and thiadiazole derivatives;

h) 0-5 wt.-% further additives such as solid lubricants and tackifiers.

Preferably, the low inhalation toxicity grease lubricants of the invention contain the components b)- and d)-h) in an amount of at least 0.01 wt.-% each.

The invention further relates to low inhalation toxicity universal transmission lubricants containing the copolymers of the invention having the specified low unsaturation degree.

Special multipurpose lubricants used in agricultural and working machines are called universal tractor transmission oils (UTTOs) as they function from a single reservoir as the brake and transmission fluid. Polyglycols are excellent basestocks for such fluids because of their low pour points and high viscosity index. Use of water soluble polyglycol base stocks would also have low aquatic toxicity and be biodegradable.

Preferred low inhalation toxicity universal transmission lubricant of the invention contain a) 85-98 wt.-% of a copolymer which is obtainable by copolymerizing ethylene oxide, propylene oxide and/or butylene oxide with an initiator monool or diol, said copolymer having a degree of unsaturation of less than about 0.01 meq/g;

b) 0-5 wt.-% metal passivators such as tolyltriazole, benzothiazole and benzotriazole;

c) 0-5 wt.-% antioxidants, including dialkylthiopropionates, organic amines and hindered phenols, e.g. dilaurylthiopropionate, dioctyldiphenylamine, phenylnaphthylamine, phenothiazine and butylated hydroxytoluene;

d) 0-5 wt.-% corrosion inhibitors such as organic acids, ethers thereof, nitrogen-, phosphorous- and sulfur containing compounds, succinic add derivatives, 4-nonylphenoxyacetic acid, alkyl and aryl phosphites and alkyl amines;

e) 0-5 wt.-% detergents such as calcium and magnesium sulfonates, salicylate;

f) 0-5 wt.-% antiwear and extreme pressure additives such as dithiophosphates, amine phosphates, phosphorothionates, carbamates, alkyl and aryl phosphates;

g) 0-5 wt.-% further additives such as dispersants, antifoam additives, friction modifiers and anti-misting agents.

Preferably, the low inhalation toxicity universal transmission lubricants of the invention contain the components b)-g) in an amount of at least 0.01 wt.-% each.

In still a further aspect of the invention, the alkylene oxide copolymers of the invention are used for the production of polyether siloxanes. For this purpose the alkylene oxide copolymer (A)

$$R-O-(AO)_n-H \quad\quad (A)$$

wherein R represents a saturated residue of a monoalcohol initiator from which a hydroxyl group is eliminated, (AO)$_n$ represents a polyoxyalkylene group formed by copolymerization of alkylene oxides as described above, n represents a number from 1 to 200, is reacted with a polysiloxane (B)

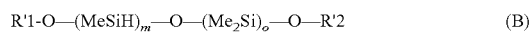

$$R'1-O-(MeSiH)_m-O-(Me_2Si)_o-O-R'2 \quad\quad (B)$$

wherein R'1 and R'2 are independently any one of Me$_3$Si, Me$_2$SiH, MeSiH$_2$ or SiH$_3$ groups, m and n are independently from each other a number from 0 to 200, with the proviso that m can be 0 only if at least one other SiH bond is present in the polysiloxane, or a polysiloxane (C)

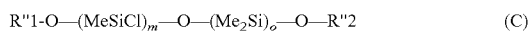

wherein R''1 and R''2 are independently any one of $Me_3Si$, $Me_2SiCl$, $MeSiCl_2$ or $SiCl_3$ groups, m and n are independently from each other a number from 0 to 200, with the proviso that m can be 0 if at least one other SiCl bond is present in the polysiloxane, to give the polyether siloxane (D)

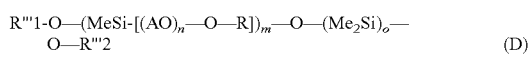

wherein R'''1 and R'''2 are independently any one of $Me_3Si$, $Me_2Si-[(AO)_n—O—R]$, $MeSi-[(AO)_n—O—R]_2$ or $Si-[(AO)_n—O—R]_3$ groups m and n are independently a number from 0 to 200, with the proviso that m can only be 0, if at least one other Si-$[(AO)_n—O—R]$ group is present in the polysiloxane.

The resulting polyether siloxane D can be used as a levelling agent in coatings or as a foam stabilizer in PU-foam, as described in DE 198 16 921; J. Henning, F. Müller, J. Peggau, "Silicontenside-Multitalente mit Rückgrat", SÖFW-Journal, 127. Jahrgang 1/2-2001, p. 38 ff; Bryant, Stewart, J. Cell. Plast., 1973, 9, p. 99-102; and U.S. Pat. No. 2,846,458.

The invention is illustrated by the following examples:

EXAMPLES

Example 1

Preparation of a DMC Catalyst (According to WO 01/64772)

1724 g of aqueous hexacyanocobaltic acid (cobalt content (9 g/l, content of Pluronic® PE 6200: 1.2% by weight) were placed in a 3 l stirred vessel equipped with a Hoesch stirrer, a pH probe and a light scattering probe and were heated while stirring to 60° C. Subsequently, while stirring at a stirring power of 1 W/l, 1464 g of aqueous zinc acetate dihydrate solution (zinc content 2.6% by weight, content of Pluronic® PE 6200 (BASF AG): 1.2% by weight based on the zinc acetate solution) which had likewise been heated to 60° C. were fed in over a period of 20 minutes. X-ray diffraction analysis of a sample taken at the end of the metered addition showed that the multimetal cyanide compound obtained had a cubic structure.

The precipitation suspension obtained in this way was then stirred at 60° C. for another 60 minutes. During this time, the pH dropped from 4.0 to 3.4. The solid was subsequently filtered off and washed on the filter with 12 times the cake volume of water.

The X50 value of the particle sizes determined in the precipitation suspension by means of laser light scattering was 7 μm.

The moist filter cake had a multimetal cyanide content of 20.8% by weight. The X-ray diffraction pattern of the solid obtained in this way could be indexed according to the monoclinic crystal system. The particle habit was platelet-like and the primary particles were only weakly agglomerated.

Example 2

250 g 1-butanol and 4,1 g KOtBu were charged in an autoclave and purged carefully with nitrogen five times. The reaction mixture was heated up to 130° C. and a mixture of 550 g ethylenoxid and 550 g propylenoxide was added at this temperature within 16 hrs. The volatile components were evaporated and the product was finished by treatment with Amberlite IR-120 (Fluka) and filtration of the ion exchanger. 1.2 kg of a slightly yellowish oil with an OH number of 141 mg KOH/g were obtained.

Example 3

310 g butyl oligoalkylene glycol of example 2 and 680 mg of the DMC catalyst from example 1 were heated to 100° C. at a pressure of 20 mbar for two hours in an autoclave. The reaction mixture was purged with nitrogen three times and then heated to 130° C. After reaching 130° C. within 15 h 1205 g propylene oxide and 1205 g ethylene oxide were added in parallel with stirring. After the addition of the oxides was finished the reaction mixture was stirred at 130° C. for one hour, then cooled to 80° C., purged with nitrogen and finally evacuated to 20 mbar to yield ca. 2,8 kg of product. The product was diluted in ethyl acetate, the catalyst was removed by filtration and solvent was evaporated.

Analytical Data:

OH-number determined according to DIN 53240: 15 mg KOH/g kinematic viscosity at 38° C.: 455 mm²/s degree of unsaturation: <0.1 g $I_2$/100 g (according to Kaufmann, DGF-C-V 116); <0.004 meq/g

Example 4

570 g butyl dipropylene glycol and 518 mg of the DMC catalyst from example 1 were heated to 100° C. at a pressure of 20 mbar for two hours in an autoclave. The reaction mixture was purged with nitrogen three times and then heated to 130° C. After reaching 130° C. a mixture of 702 g propylene oxide and 798 g ethylene oxide was added within 22 h with stirring. After the addition of the oxides was finished the reaction mixture was stirred at 130° C. for one hour, then cooled to 80° C., purged with nitrogen and finally evacuated to 20 mbar to yield ca. 2.0 kg of product, which was used in example 5 without further work-up.

Example 5

393 g of product from example 1 and 727 mg of the DMC catalyst from example 1 were heated to 100° C. at a pressure of 20 mbar for two hours in an autoclave. The reaction mixture was purged with nitrogen three times and then heated to 130° C. After reaching 130° C. a mixture of 1308 g ethylene oxide and 1599 g propylene oxide was added within 5 h with stirring. After the addition of the oxides was finished the reaction mixture was stirred at 130° C. for one hour, then cooled to 80° C., purged with nitrogen and finally evacuated to 20 mbar to yield ca. 3.2 kg of product.

Analytical Data:

OH-number determined according to DIN 53240: 9,3 mg KOH/g water content determined according to DIN 51777: 0,02% color determined according to DIN ISO 6271: 48 APHA conductivity determined according to DIN ISO 7888: 17 μS/cm pH of 10 wt.-% solution in water: 6,5 molecular weight determined by means of GPC: about 6000 g/mol dynamic viscosity at 23° C.: 2485 mPas kinematic viscosity at 23° C., determined according to DIN51562: 2393 mm²/s kinematic viscosity at 37,8° C., determined according to DIN51562: 942 mm²/s degree of unsaturation: <0,1 g $I_2$/100 g (according to Kaufmann, DGF-C-V 116); <0.004 meq/g $LC_{50}$ value determined according to OECD Guideline method 403: >2,31 mg/l

Example 6

65 g 2-ethyl hexanol and 218 mg of the DMC catalyst from example 1 were heated to 100° C. at a pressure of 20 mbar for two hours in an autoclave. The reaction mixture was purged with nitrogen three times and then heated to 130° C. After reaching 130° C. a mixture of 750 g ethylene oxide and 735 g propylene oxide was added within 3.5 h with stirring. After the addition of the oxides was finished the reaction mixture was stirred at 130° C. for one hour, then cooled to 80° C., purged with nitrogen and finally evacuated to 20 mbar to yield ca. 1.5 kg of product.

Analytical Data

OH-number determined according to DIN 53240: 17 mg KOH/g kinematic viscosity at 38° C.: 377 mm$^2$/s degree of unsaturation; 0,03 g I$_2$/100 g (according to Kaufmann, DGF-C-V 116); 0,001 meq/g

Example 7

81 g butyl diglycol and 90 mg of the DMC catalyst from example 1 were heated to 100° C. at a pressure of 20 mbar for two hours in an autoclave. The reaction mixture was purged with nitrogen three times and then heated to 130° C. After reaching 130° C. a mixture of 410 g ethylene oxide and 410 g propylene oxide was added within 22 h with stirring. After the addition of the oxides was finished the reaction mixture was stirred at 130° C. for one hour, then cooled to 80° C., purged with nitrogen and finally evacuated to 20 mbar to yield ca. 0.9 kg of product.

Analytical Data:

OH-number determined according to DIN 53240: 33 mg KOH/g kinematic viscosity at 38° C.: 146 mm$^2$/s degree of unsaturation: 0.01 g I$_2$/100 g (according to Kaufmann, DGF-C-V 116); 0.0004 meq/g

Example 8

Pluriol® P 900, which is a polypropyleneglykol of molecular weight 900 produced by alkaline catalysis, was used as an initiator for this synthesis.

900 g Pluriol P 900 and 836 mg of the DMC catalyst from example 1 were heated to 100° C. at a pressure of 20 mbar for two hours in an autoclave. The reaction mixture was purged with nitrogen three times and then heated to 140° C. After reaching 140° C. a mixture of 1167 g propylene oxide and 1277 g ethylene oxide was added within 15 h with stirring. After the addition of the oxides was finished the reaction mixture was stirred at 140° C. for one hour, then cooled to 100° C., purged with nitrogen and finally evacuated to 20 mbar to yield ca. 3.3 kg of product, which was used in example 9 below without further work-up.

Example 9

1672 g of product from example 8 and 306 mg of the DMC catalyst from example 1 were heated to 100° C. at a pressure of 20 mbar for two hours in an autoclave. The reaction mixture was purged with nitrogen three times and then heated to 140° C. After reaching 140° C. a mixture of 638 g ethylene oxide and 584 g propylene oxide was added within 3 h with stirring. After the addition of the oxides was finished the reaction mixture was stirred at 140° C. for one hour, then cooled to 100° C., purged with nitrogen and finally evacuated to 20 mbar to yield ca. 2.9 kg of product. The product was filtered at 70-80° C. to remove the catalyst.

Analytical Data:

appearance of the product: clear colorless liquid solubility in water: clear OH-number determined according to DIN 53240: 18,8 mg KOH/g water content determined according to DIN 51777: 0,1% pH of 10 wt.-% solution in water: 6,2 molecular weight determined by means of GPC: ca. 6000 g/mol kinematic viscosity at 25° C. determined according to DIN 51562: 2560 mm2/s dynamic viscosity at 20° C.: 3100 mPas dynamic viscosity at 100° C.: 170 mPas degree of unsaturation: 0.1 g I$_2$/100 g (according to Kaufmann, DGF-C-V 116); 0,004 meq/g

Example 10

A spin finish formulation is prepared by mixing: 93 wt.-% ethylene oxide/propylene oxide copolymer from example 5, after the catalyst has been removed by filtration; 5 wt.-% Lutensol® A 7 N (=C$_{12}$-C$_{14}$ fatty alcohol ethoxylated with 7 EO units) 0,5 wt.-% butylhydroxyanisole; 1,5 wt.-% lauryldimethylamine oxide.

Example 11

Reichert Wear Test

The well known Reichert wear tester consists of two cylinders made of stainless steel (V2A). One is used as the stationary wear member and the second cylinder as the rotating wear member that operates at 90° to the stationary member.

The metal cylinders are washed with ethanol prior to use, and the fluid reservoir is filled with a 1% solution of the test-substance in water. The second metal cylinder on the engine shaft is turned at least once before the weight is put on the first cylinder. After starting the rotation of the second cylinder the noise (caused by metal/metal friction) is measured. The rotation of the cylinder is measured in running meters. When lubrication starts (lubrication point), the noise level drops significantly, and running meters are noted. After 100 m the rotation is stopped, metal-cylinders are washed with ethanol and the wear-scar of the stationary wear member is analysed (measured in mm$^2$). Typical products which show good lubrication have lubrication points below 20 m and less than 20 mm$^2$ of wear after 100 m.

As a reference pure water was tested with the Reichert wear tester. A lubrication point of 100 m and 43 mm$^2$ of wear was obtained.

The polyalkyleneglycol of example 5, used as 1 wt.-% solution in water, showed a lubrication point of 14 m and a 14 mm$^2$ of wear.

Example 12

Rotational Tribometer Test

In the rotational tribometer, a ball-bearing steel ball (AISI 52100, diameter 12,7 mm, coarseness 4,09 μm) is held stationary and a steel-plate (152 mm×102 mm×0,8 mm) rotates (speed=0,05 m/s), while the ball is pressed to the plate with F=3 N. This test apparatus is the most commonly used during the development of materials for tribological applications and for lubricant formulations. The force, which is necessary to hold the ball stationary gives the static friction coefficient (μH) as well as the sliding friction coefficient (μG). The test substance is poured onto the plate to form a thin film prior to start of the measurement.

The following data was obtained:
polyalkyleneglycol prepared as described in example 5:
μH: 13
μG: 12
mineral oil (IP 26/30 H, H&R WASAG AG, Salzbergen, Germany):
μH: 16
μG: 14
The results show that the described polyalkylenglykol is superior to mineral oil and has lower friction coefficients.

The invention claimed is:

1. A method of reducing the inhalation toxicity of functional fluids, comprising:
incorporating into a functional fluid an effective amount of a copolymer which is obtainable by copolymerizing ethylene oxide, propylene oxide and/or butylene oxide with a monool initiator, said copolymer having a degree of unsaturation of less than about 0.01 meq/g, wherein the monool initiator is n-butanol or a polyoxyalkylene monoether thereof containing from 1 to 20 oxyalkylene units.

2. The method of claim 1 wherein the functional fluid is selected from the group consisting of industrial lubricants, automotive lubricants, marine lubricants and aviation lubricants.

3. The method of claim 1 wherein the functional fluid is selected from the group consisting of quenchants, lubricants for fiber production, hydraulic fluids, gear oils, compressor fluids, turbine oils, metalworking fluids, greases, bearing lubricants, wire lubricants, engine oils, mill and calender lubricants, rubber and mandrel lubricants, mold release lubricants and universal tractor fluids.

4. The method of claim 1 wherein the copolymer has an $LC_{50}$ value of more than 1000 mg/m$^3$, determined according to OECD Guideline method 403.

5. The method of claim 4 wherein the $LC_{50}$ value of the copolymer is more than 2000 mg/m$^3$, determined according to OECD Guideline method 403.

6. The method of claim 1, wherein the copolymer is an ethylene oxide/propylene oxide copolymer.

7. The method of claim 6, wherein the ethylene oxide/propylene oxide weight ratio is from 25:75 to 75:25.

8. The method of claim 1, wherein the copolymer has an average molecular weight $M_w$ of from 800 to 20 000 g/mol.

9. The method of claim 1, wherein the copolymer is obtained in the presence of a DMC catalyst.

10. The method of claim 9, wherein the DMC catalyst is zinc hexacyanocobaltate.

11. The method of claim 1, wherein the copolymer is incorporated in an amount of from 75 to 99 wt %, based on the total weight of the functional fluid, except that water, if present, is not included in the total weight.

12. A functional fluid comprising
a) 65-95 wt % of the copolymer which is obtainable by copolymerizing ethylene oxide, propylene oxide and/or butylene oxide with a monool initiator, said copolymer having a degree of unsaturation of less than about 0.01 meq/g, wherein the monool initiator is n-butanol or a polyoxyalkylene monoether thereof containing from 1 to 20 oxyalkylene units;
b) 3-20 wt % emulsifiers;
c) 0-5 wt % antistatic agents;
d) 0-5 wt % corrosion inhibitors;
e) 0-5 wt % further additives;
wherein said functional fluid is a low inhalation toxicity lubricant for fiber production.

13. A functional fluid comprising
a) 75-98 wt % of a copolymer which is obtainable by copolymerizing ethylene oxide, propylene oxide and/or butylene oxide with a monool initiator, said copolymer having a degree of unsaturation of less than about 0.01 meq/g, wherein the monool initiator is n-butanol or a polyoxyalkylene monoether thereof containing from 1 to 20 oxyalkylene units;
b) 0-5 wt % metal passivators;
c) 0-5 wt % antioxidants;
d) 0-5 wt % corrosion inhibitors;
e) 0-5 wt % antiwear and extreme pressure additives;
f) 0-5 wt % further additives;
wherein said functional fluid is a low inhalation toxicity hydraulic fluid or a low inhalation toxicity gear lubricant, or a low inhalation toxicity compressor lubricant, or a low inhalation toxicity refrigeration lubricant, or a low inhalation toxicity mill and calender lubricant.

14. A functional fluid comprising
a) 30-60 wt % of a copolymer which is obtainable by copolymerizing ethylene oxide, propylene oxide and/or butylene oxide with a monool initiator, said copolymer having a degree of unsaturation of less than about 0.01 meq/g, wherein the monool initiator is n-butanol or a polyoxyalkylene monoether thereof containing from 1 to 20 oxyalkylene units;
b) 0-40 wt % glycols;
c) 20-45 wt % water;
d) 0-15 wt % polyalkylene thickener;
e) 0-5 wt % metal passivators;
f) 0-5 wt % antioxidants;
g) 0-5 wt % corrosion inhibitors;
h) 0-5 wt % boundary lubricants;
wherein the functional fluid is a low inhalation toxicity water glycol hydraulic fluid.

15. A functional fluid comprising
a) 25-55 wt % of a copolymer which is obtainable by copolymerizing ethylene oxide, propylene oxide and/or butylene oxide with a monool initiator, said copolymer having a degree of unsaturation of less than about 0.01 meq/g, wherein the monool initiator is n-butanol or a polyoxyalkylene monoether thereof containing from 1 to 20 oxyalkylene units;
b) 35-65 wt % water;
c) 5-26 wt % metal passivators and corrosion inhibitors;
d) 0-5 wt % antioxidants;
e) 0-5 wt % antiwear and extreme pressure additives;
f) 0-5 wt % further additives;
wherein the functional fluid is a low inhalation toxicity water soluble metalworking fluid.

16. A functional fluid comprising
a) 50-99 wt % of a copolymer which is obtainable by copolymerizing ethylene oxide, propylene oxide and/or butylene oxide with a monool initiator, said copolymer having a degree of unsaturation of less than about 0.01 meq/g, wherein the monool initiator is n-butanol or a polyoxyalkylene monoether thereof containing from 1 to 20 oxyalkylene units;
b) 0-30 wt % glycol ethers;
c) 0-20 wt % glycols;
d) 0-5 wt % metal passivators;
e) 0-5 wt % antioxidants;
f) 0-5 wt % corrosion inhibitors;
g) 0-5 wt % antiwear and extreme pressure additives;
h) 0-5 wt % further additives;
wherein the functional fluid is a low inhalation toxicity DOT 3 brake fluid.

17. A functional fluid comprising
a) 85-98 wt % of a copolymer which is obtainable by copolymerizing ethylene oxide, propylene oxide and/or butylene oxide with a monool initiator, said copolymer having a degree of unsaturation of less than about 0.01 meq/g, wherein the monool initiator is n-butanol or a polyoxyalkylene monoether thereof containing from 1 to 20 oxyalkylene units;
b) 0-5 wt % metal passivators;
c) 0-5 wt % antioxidants;
d) 0-5 wt % corrosion inhibitors;
e) 0-5 wt % detergents;
f) 0-5 wt % antiwear and extreme pressure additives;
g) 0-5 wt % further additives;
wherein the functional fluid is a low inhalation toxicity 4-stroke engine lubricant or a low inhalation toxicity 2-cycle engine lubricant or a low inhalation toxicity universal transmission lubricant.

18. A functional fluid comprising
a) 90-99 wt % of a copolymer which is obtainable by copolymerizing ethylene oxide, propylene oxide and/or butylene oxide with a monool initiator, said copolymer having a degree of unsaturation of less than about 0.01 meq/g, wherein the monool initiator is n-butanol or a polyoxyalkylene monoether thereof containing from 1 to 20 oxyalkylene units;
b) 0-5 wt % antioxidants;
c) 0-5 wt % further additives;
wherein the functional fluid is a low inhalation toxicity mandrel or mold release lubricant for processing of rubber based elastomers.

19. A functional fluid comprising
a) 5-35 wt % of a copolymer which is obtainable by copolymerizing ethylene oxide, propylene oxide and/or butylene oxide with a monool initiator, said copolymer having a degree of unsaturation of less than about 0.01 meq/g, wherein the monool initiator is n-butanol or a polyoxyalkylene monoether thereof containing from 1 to 20 oxyalkylene units;
b) 65-95 wt % water;
c) 0-5 wt % corrosion inhibitors;
d) 0-5 wt % further additives;
wherein the functional fluid is a low inhalation toxicity quenchant.

20. A functional fluid comprising
a) 40-85 wt % of a copolymer which is obtainable by copolymerizing ethylene oxide, propylene oxide and/or butylene oxide with a monool initiator, said copolymer having a degree of unsaturation of less than about 0.01 meq/g, wherein the monool initiator is n-butanol or a polyoxyalkylene monoether thereof containing from 1 to 20 oxyalkylene units;
b) 0-45 wt % butanol initiated polypropylene glycol;
c) 5-15 wt % thickeners;
d) 0-5 wt % metal passivators;
e) 0-5 wt % antioxidants;
f) 0-5 wt % corrosion inhibitors;
g) 0-5 wt % antiwear and extreme pressure additives;
h) 0-5 wt % further additives;
wherein the functional fluid is a low inhalation toxicity grease lubricant.

21. The functional fluid of any of claims 12-15, 16, 17 and 18-20 wherein the $LC_{50}$ value of the copolymer is more than 1000 $mg/m^3$, determined according to OECD Guideline method 403.

22. The functional fluid of any of claims 12-15, 16, 17 and 18-20 wherein the copolymer is a ethylene oxide/propylene oxide copolymer.

23. The functional fluid according to claim 20, wherein the copolymer is obtained by copolymerizing ethylene oxide, propylene oxide and/or butylene oxide with a monool initiator, said copolymer having a degree of unsaturation of less than about 0.01 meq/g, wherein the monool initiator is n-butanol or a polyoxyalkylene monoether thereof containing from 1 to 20 oxyalkylene units.

24. The functional fluid according to claim 19, wherein the copolymer is obtained by copolymerizing ethylene oxide, propylene oxide and/or butylene oxide with a monool initiator, said copolymer having a degree of unsaturation of less than about 0.01 meq/g, wherein the monool initiator is n-butanol or a polyoxyalkylene monoether thereof containing from 1 to 20 oxyalkylene units.

25. The functional fluid according to claim 18, wherein the copolymer is obtained by copolymerizing ethylene oxide, propylene oxide and/or butylene oxide with a monool initiator, said copolymer having a degree of unsaturation of less than about 0.01 meq/g, wherein the monool initiator is n-butanol or a polyoxyalkylene monoether thereof containing from 1 to 20 oxyalkylene units.

26. The functional fluid according to claim 17, wherein the copolymer is obtained by copolymerizing ethylene oxide, propylene oxide and/or butylene oxide with a monool initiator, said copolymer having a degree of unsaturation of less than about 0.01 meq/g, wherein the monool initiator is n-butanol or a polyoxyalkylene monoether thereof containing from 1 to 20 oxyalkylene units.

27. The functional fluid according to claim 16, wherein the copolymer is obtained by copolymerizing ethylene oxide, propylene oxide and/or butylene oxide with a monool initiator, said copolymer having a degree of unsaturation of less than about 0.01 meq/g, wherein the monool initiator is n-butanol or a polyoxyalkylene monoether thereof containing from 1 to 20 oxyalkylene units.

28. The functional fluid according to claim 15, wherein the copolymer is obtained by copolymerizing ethylene oxide, propylene oxide and/or butylene oxide with a monool initiator, said copolymer having a degree of unsaturation of less than about 0.01 meq/g, wherein the monool initiator is n-butanol or a polyoxyalkylene monoether thereof containing from 1 to 20 oxyalkylene units.

29. The functional fluid according to claim 14, wherein the copolymer is obtained by copolymerizing ethylene oxide, propylene oxide and/or butylene oxide with a monool initiator, said copolymer having a degree of unsaturation of less than about 0.01 meq/g, wherein the monool initiator is n-butanol or a polyoxyalkylene monoether thereof containing from 1 to 20 oxyalkylene units.

30. The functional fluid according to claim 13, wherein the copolymer is obtained by copolymerizing ethylene oxide, propylene oxide and/or butylene oxide with a monool initiator, said copolymer having a degree of unsaturation of less than about 0.01 meq/g, wherein the monool initiator is n-butanol or a polyoxyalkylene monoether thereof containing from 1 to 20 oxyalkylene units.

31. The functional fluid according to claim 12, wherein the copolymer is obtained by copolymerizing ethylene oxide, propylene oxide and/or butylene oxide with a monool initiator, said copolymer having a degree of unsaturation of less than about 0.01 meq/g, wherein the monool initiator is n-butanol or a polyoxyalkylene monoether thereof containing from 1 to 20 oxyalkylene units.

32. The method according to claim 1, wherein the copolymer is obtained by copolymerizing ethylene oxide, propylene oxide and/or butylene oxide with a monool initiator, said copolymer having a degree of unsaturation of less than about 0.01 meq/g, wherein the monool initiator is n-butanol or a polyoxyalkylene monoether thereof containing from 1 to 20 oxyalkylene units.

* * * * *